Patented Jan. 13, 1942

2,269,751

UNITED STATES PATENT OFFICE 2,269,751

BAKING VARNISH OR ENAMEL FILMS

Robert Bowling Barnes, Stamford, Conn., assignor to American Cyanamid Company, New York, N. Y., a corporation of Maine No Drawing. Application February 10, 1940, Serial No. 318,385

4 Claims. (Cl. 34—4)

This invention relates to the production of varnish or enamel coatings having a high degree of hardness, toughness and flexibility. More particularly this invention relates to the production of varnish or enamel films on electrical wire having the desirable properties mentioned.

An object of this invention is to dry and harden films of drying oil optionally containing natural or synthetic resins to produce tack-free films which have a high degree of hardness, toughness and flexibility. Another object of this invention is to provide a means of obtaining tack-free films of varnishes or enamels which have sufficient hardness, toughness and flexibility to be suitable as electrical wire coatings.

These and other objects are attained by subjecting films of varnishes or enamels to ultra-violet light radiation and to heat preferably below about 300° C. but sufficiently high to evaporate any volatile solvents present in the varnish or enamel, all for a short period of time and then baking the tack-free film thus produced for a relatively long period of time at a relatively low temperature e. g. 85°–110° C. until optimum properties are obtained.

The following examples, in which the proportions are in parts by weight, are given by way of illustration and not in limitation.

Example 1

| | Parts |
|---|---|
| Phthalic anhydride | 148 |
| Glycerol | 100 |
| Linseed oil fatty acids | 80 |
| Tung oil | 317 |
| Ester gum | 125 |
| Resin "A" | 150 |

Resin "A" may be a fatty oil-soluble resin such as a phenol-formaldehyde condensate modified with rosin and if desirable partially or completely esterified with glycerol or other alcohol. Otherwise it may be an oil-soluble phenol-aldehyde resin obtainable by reacting formaldehyde with an alkyl or an aryl substituted phenol. The phthalic anhydride, glycerol and linseed oil fatty acids are reacted in any well-known manner until a relatively low acid number alkyd resin is obtained. The resin is then mixed with the tung oil and to this the ester gum and resin "A" are added, the whole being heated sufficiently to form a homogeneous solution. About 40 parts of this resin are dissolved in a solvent mixture containing, for example, 10 parts of furfural, 5 parts of dibutyl phthalate and 45 parts of coal tar naphtha (boiling point from 163°–177° C. and a flash point of 116° C.). This composition is applied to copper wire of any desired size.

For purposes of this example the application of the composition as prepared above will be described with respect to copper wire 0.0113 inch in diameter. The composition may be applied in the usual manner by passing the wire through a bath containing the varnish solution and the coated wire is dried by passing the wire through a suitable apparatus containing infra red lamps in close proximity to the wire, for example, withing 6 inches to 2 feet from the wire and also having a source of ultra-violet light radiation directed toward the wire. For the size of wire used herein a drying tower about 12–18 feet high is suitable. With a tower of this size the linear speed of the wire passing through the tower may be about 12–15 feet per minute. In order to obtain the proper thickness of film it is generally preferable that the wire be coated from four to eight times and dried after each coating. In this way a film having a thickness of about 0.9 mil is built up by coating the wire a sufficient number of times. Using this procedure the time of each baking is from about thirty seconds to one minute. The relative hardness after this baking operation is about 60–100. The wire is then subjected to a low temperature bake at about 100° C. for about sixteen to twenty-four hours, after which time the relative hardness is about 250–350. The flexibility of the film produced is excellent.

Relative hardness is an arbitrary measure of the force necessary to cut through the film of varnish and enamel and expose the copper wire. It is expressed in terms of the compression of a spring, the tension of which is exerted against a cutting edge having a smooth radius of curvature of .004 inch. The cutting edge is applied to the wire and the compression of the spring is gradually increased until the enamel film is broken through. The compression of the spring at the time that the film breaks through is the relative hardness and is expressed in arbitrary units.

While the above example deals with a particular size of wire, the procedure is generally applicable to any of the commercial sizes of wire. The linear speed of the wire in the drying tower will vary according to size from about 6 to 150 feet per minute and the drying tower will vary in height, according to the size of the wire, from about 3 to about 40 feet. Obviously the wire may be coated in any suitable manner as by spraying, by rollers, etc., although it has generally been

Example 2

A varnish solution prepared in accordance with Example 1 is sprayed on to sheet metal, the viscosity of the composition having been adjusted by the addition of coal tar naphtha solvent to give a coating of about 0.001 inch thickness. The coated material may then be baked in an oven at a temperature of about 250° C. while exposed to ultra-violet radiation for approximately two minutes, thereby producing on cooling a substantially tack-free film having a Sward hardness of about 20–22. The panel is then baked for about sixteen hours at a temperature of about 100° C. after which time the Sward hardness is about 30. After an additional eight hours at 100° C. the Sward hardness is about 50 at which time optimum hardness is reached.

Many other resins may be substituted for all or part of that used in the foregoing example with similar comparative results. Examples of these include alkylated melamine-formaldehyde resins, alkylated urea-formaldehyde resins, oil-soluble phenol-formaldehyde resins, oil-soluble styrene resins, polymerized coumaron-indene resin, natural resins such as copal, manila, etc. Dehydroxylated castor oil, perilla oil, etc. may be substituted for all or part of the tung oil. Obviously many other modifications of the varnish may be made.

The hardness of films which have the low temperature bake following a bake at a temperature which will volatilize the solvent material in the varnish and in the presence of ultra-violet radiation is much higher than if the film be baked at a high temperature for either a shorter or the same total length of time and either in the presence or absence of ultra-violet radiation. For example wire coated with the composition of Example 1 and baked at 350° C. for about sixteen to twenty-four hours, i. e. for the same total length of time as in Example 1, has a relative hardness of only about 80–120. It is also to be noted that by the use of the ultra-violet radiation in conjunction with the initial heat of baking, a tack-free film is obtained, thereby permitting coated wire, for example, to be wound on to a spool and the spool of wire to be subsequently placed in a low temperature baking oven until the optimum properties are obtained, generally requiring from about fifteen up to one hundred hours.

The initial baking temperature is preferably above about 150° C. and below about 300° C. It is, however, selected according to the volatile solvent which is used in the varnish. A temperature is selected which will volatilize the solvent relatively rapidly and which at the same time will leave a uniform and substantially bubble-free film.

The low temperature bake should be at a temperature below about 110° C. preferably around about 100° C. but it may be lower, for example, at about 85° C.

My invention may be applied to many other coating operations such as the coating of metal rods, metal tubes, etc. Furthermore the invention is applicable to the drying of varnish films and similar coatings on pre-fabricated articles such as cans, metal toys, automobiles, metal cabinets, etc.

Obviously many modifications may be made in the compositions and processes described above without departing from the spirit and scope of the invention as defined in the appended claims.

I claim:

1. A process which comprises subjecting a varnish film to a temperature between about 150° C. and 300° C. in the presence of ultra-violet radiation for a relatively short period of time and subsequently baking the film at a relatively low temperature for a relatively long period of time, thereby obtaining films having a high degree of hardness and toughness.

2. A process which comprises subjecting a varnish film containing a volatile solvent to a temperature sufficiently high to volatilize said solvent in the presence of ultra-violet radiation for a relatively short period of time and subsequently subjecting the film to a low temperature bake below about 110° C. for a relatively long period of time until optimum properties are produced.

3. A process which comprises subjecting a varnish film containing a volatile solvent to a temperature between about 150° C. and 300° C. but sufficiently high to volatilize said solvent in the presence of ultra-violet radiation for a relatively short period of time and subsequently subjecting the film to a low temperature bake below about 110° C. for a relatively long period of time until optimum properties are produced.

4. A process which comprises subjecting a varnish film containing a volatile solvent to a temperature between about 150° C. and 300° C. but sufficiently high to volatilize said solvent in the presence of ultra-violet radiation for a relatively short period of time and subsequently subjecting the film to a low temperature bake between about 85° and 110° C. for a relatively long period of time until optimum properties are produced.

ROBERT BOWLING BARNES.